US012779364B2

(12) United States Patent
Varady

(10) Patent No.: US 12,779,364 B2
(45) Date of Patent: Nov. 3, 2026

(54) NANOFLUID COMPOSITION FOR DISPLACEMENT OF ENTRAINED CONTAMINANTS FROM RESTRICTED GEOMETRIES AND CAPILLARY FEATURES

(71) Applicant: Government of the United States as Represented by the Secretary of the Army, APG, MD (US)

(72) Inventor: Mark Varady, Aberdeen, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/632,607

(22) Filed: Apr. 11, 2024

(65) Prior Publication Data

US 2025/0319423 A1 Oct. 16, 2025

(51) Int. Cl.

| | |
|---|---|
| ***B01D 11/00*** | (2006.01) |
| ***A62D 3/30*** | (2007.01) |
| ***B01D 11/02*** | (2006.01) |
| *A62D 101/02* | (2007.01) |
| *A62D 101/26* | (2007.01) |
| *A62D 101/28* | (2007.01) |

(52) U.S. Cl.
CPC ............ *B01D 11/0288* (2013.01); *A62D 3/30* (2013.01); *A62D 2101/02* (2013.01); *A62D 2101/26* (2013.01); *A62D 2101/28* (2013.01)

(58) Field of Classification Search
CPC .. B01D 11/0288; A62D 3/30; A62D 2101/02; A62D 2101/26; A62D 2101/28
USPC .......................................................... 510/110
See application file for complete search history.

(56) References Cited

U.S. PATENT DOCUMENTS

| | | | | |
|---|---|---|---|---|
| 6,566,574 | B1 * | 5/2003 | Tadros | A62D 3/38 252/186.41 |
| 2009/0291151 | A1 * | 11/2009 | Tucker | A01N 37/16 510/110 |
| 2017/0051234 | A1 * | 2/2017 | Foster | C11D 3/349 |
| 2019/0010375 | A1 * | 1/2019 | Atieh | F28F 23/00 |

OTHER PUBLICATIONS

Langmuir 1996, 12,2402-2407.*
Liu et al. Understanding the stability mechanisum of silica nanoparticles Nov. 2020.*
Alzobaidi et al., Effect of surface chemistry of silica nanoparticles on contact angle of oil on calcite surfaces in concentrated brine with divalent ions, J. Colloid Interface Sci, 2021, 581, 656-668.

(Continued)

*Primary Examiner* — Eisa B Elhilo
(74) *Attorney, Agent, or Firm* — Smit Kapadia

(57) ABSTRACT

The present invention is directed to an aqueous nanofluid composition and the method of use thereof for displacing or removing chemical warfare agents (CWAs) from capillary spaces, the nanofluid composition comprising water, colloidal silica, and at least one surfactant, such that the nanofluid composition is adjacent to the capillary features to absorb the CWAs from the capillary features. Upon displacement or removal, the CWAs are ready for disposal.

1 Claim, 5 Drawing Sheets

(56) References Cited

OTHER PUBLICATIONS

Luo et al., Nanofluid of graphene-based amphiphilic Janus nanosheets for tertiary or enhanced oil recovery: High performance at low concentration, Proc. Natl. Acad. Sci U.S.A. 2016, 113 (28), 7711-7716.

Raber et al., Oxidative decontamination of chemical and biological warfare agents using L-Gel, J. Hazardous Materials, B93 (2002) 339-352.

Liu, et al., Understanding the stability mechanism of silica nanoparticles: The effect of cations and EOR chemicals, Fuel: vol. 280, Nov. 15, 2020, 118650.

* cited by examiner 15
12
20
30
18
25

4b
12
18
15
4a 15
20
12
18
4a-4b
25

1
15
12
4a-4b
18
5
7
9
$r_{shim}$
$r_{top}$
$r_{bottom}$

NANOFLUID COMPOSITION FOR DISPLACEMENT OF ENTRAINED CONTAMINANTS FROM RESTRICTED GEOMETRIES AND CAPILLARY FEATURES

STATEMENT OF GOVERNMENT INTEREST

The invention described herein may be manufactured, used, and licensed by or for the United States Government.

FIELD OF THE INVENTION

The invention is directed towards a composition useful for decontaminating restricted geometries or capillary features.

BACKGROUND OF THE INVENTION

Much of the research on decontamination of materials exposed to chemical warfare agents ("CWAs") has focused on the ideal case of a flat, horizontally oriented material surface. However, real military assets have complex features with small gaps resulting from mated surfaces, discontinuities, screw threads, etc. When a liquid-phase CWA wets a material of interest, capillary forces may pull the CWA into these small gaps. Once the CWA is stabilized in such a capillary feature, it is difficult to remove; interaction with a decontaminant is limited by the exposed surface area, which may be extremely small. Both capillary and viscous forces become greater as the size of the capillary decreases and the liquid becomes more difficult to remove. As the available interaction area decreases, the rates of agent evaporation, dissolution, and reaction taking place at the capillary entrance also diminish.

These limitations severely reduce the effectiveness of typical decontamination treatments. In recent work, the vapor emission of a CWA simulant from various sizes of capillary features were examined, with and without a standard rinse treatment. It was found that the vapor emission from capillaries below a certain size threshold (~100 μm) was unaffected by the rinse process, indicating the difficulty of removing agents from small capillaries. Currently, work is ongoing to quantify the hazard from capillary-entrained agents relative to other sources on military assets (e.g., liquid on surface or absorbed in polymer-based paint coatings) and the effectiveness of different decontamination treatments (e.g., reactive slurry and hot air flow). Results indicate that the capillary-entrained CWA accounts for a significant fraction of total residual CWA after a decontamination treatment, and that various decontamination treatments are ineffective for capillary features.

One strategy for overcoming these limitations imposed by the capillary-entrained agents is to remove the agents from the capillary features, so that the decontaminant may optimally contact the agents. Finding effective techniques for removing CWAs from a capillary feature is potentially a difficult problem requiring a significant research investment.

A few efforts on removing or disassociating unwanted agents or chemicals from matrices or small spaces are known. For examples, in the field of enhanced oil recovery ("EOR"), it is desired to remove and recover oil trapped in small underground rock pores. Alzobaidi et al. in "Effect of surface chemistry of silica nanoparticles on contact angle of oil on calcite surfaces in concentrated brine with divalent ions" (J. Colloid Interface Sci, 2021, 581, 656-668) disclose the use of silica nanofluids for EOR, such that the surface charge of silica nanoparticles changes a calcite surface from oil-wet to water-wet and accelerates the dewetting rate of hexane from the surface. Alternatively, Luo et al. in "Nanofluid of graphene-based amphiphilic Janus nanosheets for tertiary or enhanced oil recovery: High performance at low concentration" (Proc. Natl. Acad. Sci U.S.A. 2016, 113 (28), 7711-7716) discloses that Janus graphene oxide ("GO") based nanosheets aggregate at the oil-water interface, reducing the interfacial tension is reduced.

Alternatively, Raber et al. in "Oxidative decontamination of chemical and biological warfare agents using L-Gel" (J. Hazardous Materials, B93 (2002) 339-352) teaches the use of "L-Gel" comprising an oxidizer and fumed silica gel for decontaminants CWA such that the silica absorbs the agents from a sprayed surface, and the L-Gel is safely removed. However, Raber focuses on "spray and remove" method, and does not teach or suggest substantial CWA removal from capillary features.

Therefore, there remains, a long felt need for a composition specifically for removing CWAs from capillary features.

SUMMARY OF THE INVENTION

The invention is directed towards an aqueous nanofluid composition for displacing or removing at least one of chemical warfare agents (CWAs) from capillary features, comprising water, colloidal silica, and at least one surfactant, wherein at least 50% of at least one of said CWAs from within said capillary features is being displaced into said composition at 165 seconds or more of incubation time of the capillary features with the nanofluid composition.

The invention is also directed towards a method of displacement or removing at least one of CWAs from capillary features, comprising incubating the capillary features with an aqueous nanofluid composition comprising water, colloidal silica, and at least one surfactant for 165 seconds or more to achieve at least 50% of displacement of at least one of said CWAs from within the capillary features into the nanofluid composition, then thereafter removing the nanofluid composition from the vicinity of the capillary features.

According to a first embodiment, an aqueous nanofluid composition for displacing or removing at least one of chemical warfare agents (CWAs) from capillary features comprises water; colloidal silica; and at least one surfactant, wherein chemical warfare agents (CWAs) are selected from sulfur mustard ("HD") and O-ethyl-S-(2-diisopropylamino-ethyl) methyl phosphonothiolate ("VX") and mixtures thereof, wherein said surfactant is selected from the group consisting of Alkyl (C8-18) sulfate and its ammonium, calcium, isopropylamine, magnesium, potassium, sodium, and/or zinc salts.

The colloidal silica may have a particle size of between 15 and 20 nm. The colloidal silica may have a volume fraction of 0.05 to 0.17. The silica has a concentration of 100 to 374 mg/ml.

The surfactant may be present in a molar concentration (M) of 0.004 to 0.2.

According to a second embodiment of the invention, a method for displacing or removing at least one chemical warfare agent (CWA) from capillary features comprises 1) applying an aqueous nanofluid composition comprising water, colloidal silica, and at least one surfactant onto or adjacent to said capillary features, such that said capillary features have no direct atmosphere contact; 2) waiting for a minimum of 120 seconds, to allow for evaporation or reduction of water within said nanofluid of at least 5% to form a concentrated nanofluid, such that said concentrated nanofluid displaces or forces migration of said at least one CWA from said capillary features into said concentrated nanofluid; and 3) removing said concentrated nanofluid composition.

Step 2) may comprise waiting for a minimum of 165 seconds and a water loss of at least 10% from said aqueous nanofluid composition to form a concentrated nanofluid.

In the alternative, Step 2) may comprise waiting for a minimum of 400 seconds and a water loss of at least 15% from said aqueous nanofluid composition to form a concentrated nanofluid.

The method may further comprise achieving at least 35% of displacement or removal of the at least one CWA from within said capillary features into said concentrated nanofluid.

In the alternative, the method may further comprise achieving at least 50% of displacement or removal of the at least one CWA from within capillary features into said concentrated nanofluid.

In another variation, the method of displacing or removing at least one chemical warfare agent (CWA) from capillary features may further comprise achieving at least 75% of displacement or removal of the at least one CWA from within capillary features into said concentrated nanofluid.

According to a third embodiment of the invention, a method for displacing or removing at least one chemical warfare agent (CWA) from capillary features comprises 1) applying an aqueous nanofluid composition comprising water, colloidal silica, and at least one surfactant onto or adjacent to said capillary features, such that said capillary features have no direct atmosphere contact; 2) waiting for a minimum of 120 seconds to allow for an aggregation of the colloidal silica within the nanofluid wherein said aggregation exerts a displacement or migration of said at least one CWA from said capillary features into said nanofluid composition; and 3) removing said nanofluid composition entirely from the premise of said capillary features.

The nanofluid composition may contain a salt selected from NaCl, $MgCl_2$, $CaCl_2$), and mixtures thereof. The nanofluid composition may contain NaCl in an amount of between 500 mM and 1000 mM. The nanofluid composition may contain $MgCl_2$ or $CaCl_2$) in an amount of between 1.25 mM and 3 mM. The nanofluid composition may have a pH between 8 and 10. The method may further comprise achieving at least 50% displacement of said at least one CWA from within said capillary features into said nanofluid composition.

Components, elements, and features described herein may be combined in any desired manner to achieve the desired performance goals.

DETAILED DESCRIPTION OF THE INVENTION

Figures 1A, 1B, 1C, 1D:
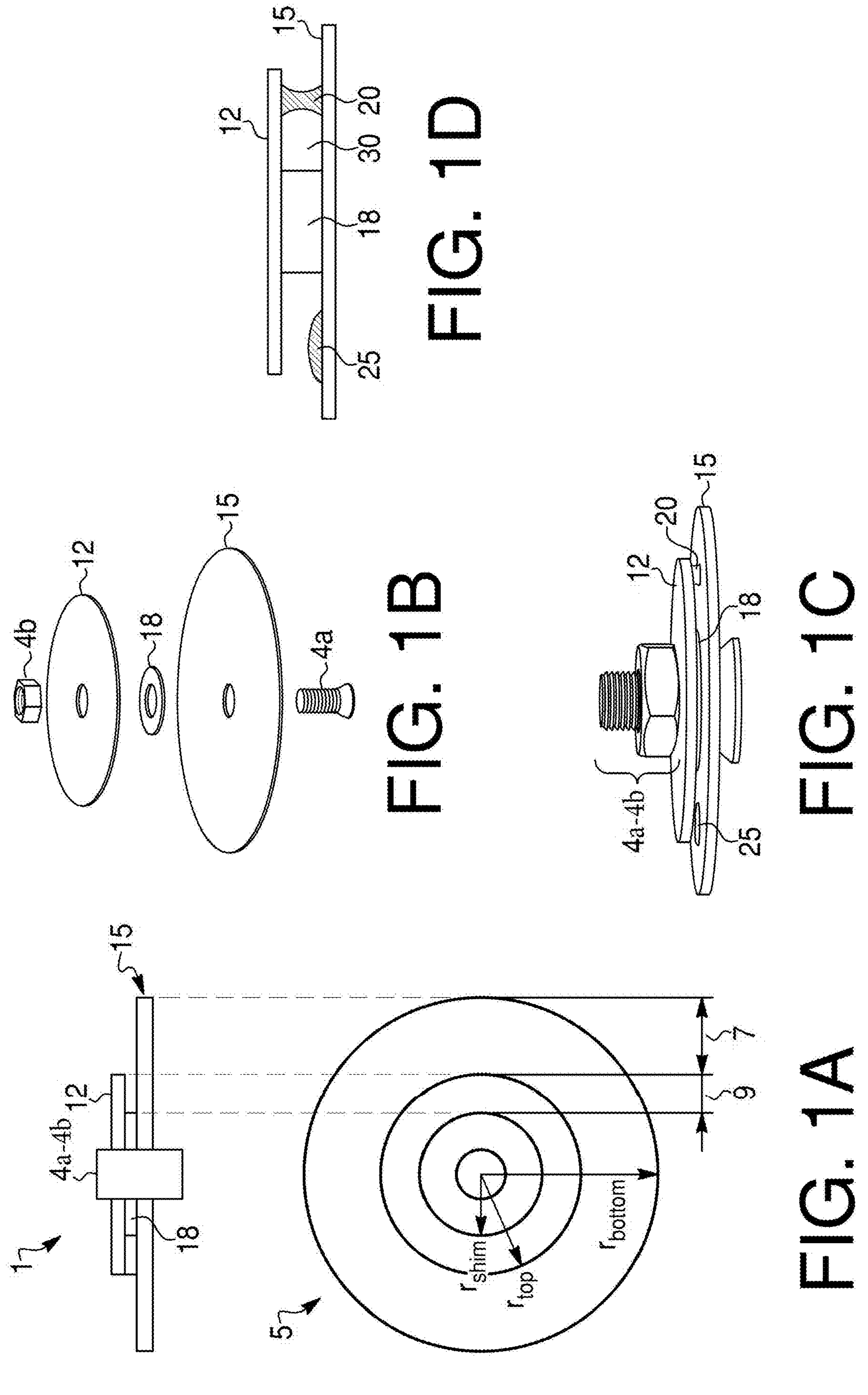
FIGS. 1A to 1D depict a radial capillary geometry used in visualization experiments.

The invention is directed towards an aqueous nanofluid composition for displacing or removing at least one of chemical warfare agents (CWAs) from capillary features, comprising water, colloidal silica, and at least one surfactant, wherein 30% of at least one of the CWAs from within the capillary features is displaced into said composition at 120 seconds or more of incubation time of the capillary features with the nanofluid composition.

The invention is also directed towards an aqueous nanofluid composition for displacing or removing at least one of chemical warfare agents (CWAs) from capillary features, comprising water, colloidal silica, and at least one surfactant, wherein 50% of at least one of the CWAs from within the capillary features is displaced into said composition at 165 seconds or more of incubation time of the capillary features with the nanofluid composition.

The invention is further directed towards an aqueous nanofluid composition for displacing or removing at least one of chemical warfare agents (CWAs) from capillary features, comprising water, colloidal silica and at least one surfactant, wherein 75% of at least one of the CWAs from within the capillary features is displaced into said composition at 400 seconds or less of incubation time of the capillary features with the nanofluid composition.

The invention is also directed towards a method of displacing or removing at least one of CWAs from capillary features, comprising incubating the capillary features with an aqueous nanofluid composition comprising water, colloidal silica, and at least one surfactant for 120 seconds or more to achieve at least 30% of displacement of at least one of the CWAs from within capillary features into the nanofluid composition, then thereafter removing said composition from the vicinity of the capillary features.

The invention is further directed towards a method of displacing or removing at least one of CWAs from capillary features, comprising incubating the capillary features with an aqueous nanofluid composition comprising water, colloidal silica, and at least one surfactant for 165 seconds or more to achieve at least 50% of displacement of at least one of the CWAs from within capillary features into the nanofluid composition, then thereafter removing said composition from the vicinity of the capillary features.

The invention is also directed towards a method of displacing or removing at least one of CWAs from capillary features, comprising incubating the capillary features with an aqueous nanofluid composition comprising water, colloidal silica, and at least one surfactant for 400 seconds or more to achieve at least 75% of displacement of at least one of the CWAs from within capillary features into the nanofluid composition, then thereafter removing said composition from the vicinity of the capillary features.

The colloidal silica present in the aqueous nanofluid composition is in the amount of 2 vol. % to 25 vol. %, preferably in the amount of 3.5 vol. % to 20 vol. %, more preferably in the amount of 5.0 vol. % to 17 vol. % within the composition. Alternatively, the colloidal silica is present in the concentration amount from 90 to 500 mg/ml, preferably 100 to 400 mg/ml, more preferably 110 to 374 mg/ml within the composition.

The colloidal silica has a particle size of 2 to less than 20 nm, preferably 4 to 12 nm, and more preferably 5 to 10 nm. A useful silica is Ludox SM colloidal silica (7 nm particle size) in water (product no. 420794; Sigma-Aldrich).

Useful surfactants for the present invention are selected from but not limited to, the group consisting of Alkyl ($C_{8-18}$) sulfate and its ammonium, calcium, isopropylamine, magnesium, potassium, sodium, and zinc salts. Alternatively, other useful anionic surfactants are ammonium lauryl sulfate, sodium laureth sulfate, sodium lauryl sarcosinate, sodium myreth sulfate, sodium pareth sulfate, sodium stearate, sodium lauryl sulfate, a olefin sulfonate, sodium dodecyl sulfate, ammonium laureth sulfate dodecyl trimethylammonium chloride, and secondary alcohol ethoxylates such as Tergitol 15-S-9.

The useful surfactant present in the aqueous nanofluid composition is in the molar concentration of 0.003M to 0.025M, preferably from 0.004M to 0.02 M, within the composition. The aqueous composition is made by mixing the surfactant in water, then mixing the aqueous surfactant solution with the aqueous suspension of colloidal silica to achieve the desired composition.

For the present invention, "capillary feature" is defined as a confined space with the smallest dimension up to 100 microns, preferably up to 50 microns, more preferably up to 25 microns and most preferably up to 10 microns in the forms of cracks, crevasses, restricted geometries, such as a narrow space between a screw washer and a screw head, spaces between screw threads and the surrounding wall of the corresponding slots, cracks in the concrete walls, gaps between plates, etc., such that the capillary pressure is up to 3500 Pa, preferably up to 7000 Pa, more preferably up to 14000 Pa and most preferably up to 35000 Pa.

For the present invention, "displacing" or "displacement" serves as an equivalent to decontamination or removal of the CWAs from capillary features. The present invention does not neutralize the CWAs onsite or inside of the capillary features. Specifically, CWAs are being removed from capillary features by the absorptive property of the inventive composition and migrate or being placed (absorbed) into the inventive nanofluid composition, such that the nanofluid contained the CWAs therein is then ready for disposal. However, incorporating a reactive component into the formulation may allow the extracted CWA to be neutralized onsite.

For the present invention, "incubation" of the aqueous nanofluid composition with the capillary features is defined as a placement of the aqueous nanofluid composition adjacent to the capillary features, such that the contaminated capillary features have no direct contact with atmosphere, other chemicals or compounds in the form or liquid, gas, or solid, to ensure that the CWAs may only be displaced or migrated into the nanofluid composition.

For the present invention, chemical warfare agents (CWAs) include but are not limited to, traditional agents such as sulfur mustard ("HD") and O-ethyl-S-(2-diisopropylaminoethyl) methyl phosphonothiolate ("VX"). Simulants of CWAs were also identified to enable visualization experiments outside of engineering controls. Specifically, 1-chlorooctane (product no. 125156; Sigma-Aldrich; St. Louis, MO) and 1,8-dichlorooctane (product no. 361283; Sigma-Aldrich) were identified as simulants for HD, and silicone oil (product no. 378321; Sigma-Aldrich) was selected as a simulant for VX. Dyes were used to aid with the visualization of the simulants. Specifically, Fluorosol Red 7348 (Koch Color; Bennett, CO) was used to dye 1-chlorooctane, Fluorosol GR 7200 (Koch Color) was used to dye 1,8-dichlorooctane, and BODIPY 505/515 (Thermo Fisher Scientific; Waltham, MA) was used to dye silicone oil.

Table 1 summarizes the CWAs and their simulants useful for the present invention, along with the critical properties surface tension and viscosity.

TABLE 1

CWAs and Simulants Used in This Study and Their Relevant Properties

| Chemical | Viscosity (cP) | Surface Tension (dyn/cm) | Density (g/cm$^3$) |
|---|---|---|---|
| HD | ~5 | ~43 | 1.27 |
| VX | ~10 | ~22 | 1.01 |
| 1-Chlorooctane | 1.24 | ~26 | 0.875 |
| 1,8-Dichlorooctane | ~3 | 36 | 1.03 |
| Silicone oil | 10 | ~20 | ~0.90 |

For the displacing or decontaminating capillary features, an user 1) applies the aqueous nanofluid composition onto or adjacent to capillary features which are known to contain the CWAs; 2) waits for a minimum of 120 seconds, preferably a minimum of 165 seconds, and more preferably at a minimum of 400 seconds to allow for evaporation or reduction of water within the nanofluid at a water loss of at least 15%, to exert a capillary force on the adjacent CWAs, causing displacement or migration from the capillary features into the nanofluid; and 3) wipes off or remove the nanofluid entirely from the premise or vicinity of the capillary features.

Alternatively, instead of evaporation, the silica nanoparticles also aggregate due to a change in pH and salinity of the solution. In particular, aggregation of silica nanoparticles may occur between 500 mM and 1000 mM of NaCl, or 1.25 to 3 mM of $MgCl_2$ or $CaCl_2$) at a pH between 8 to 10. This alternative method of aggregation is being described in more detail in "Understanding the stability mechanism of silica nanoparticles: The effect of cations and EOR chemicals" by Liu et al. in Fuel: Volume 280, 15 Nov. 2020, 118650, which is incorporated herein by reference.

Methods

Aqueous surfactant solutions were prepared above and below the critical micelle concentrations ("CMCs") using the anionic surfactant sodium dodecyl sulfate (SDS; product no. 436143; Sigma-Aldrich; CMC of 0.008 M); the cationic surfactant dodecyl trimethylammonium chloride (DTAC; product no. 44242; Sigma-Aldrich; CMC of 0.02 M); and the non-ionic surfactant Tergitol 15-S-9 (product no. 15S9; Sigma-Aldrich; CMC of 39 ppm).

Ludox SM colloidal silica (7 nm particle size) in water (product no. 420794; Sigma-Aldrich) was used to make silica-based nanofluids. In the silica nanofluid formulations, the surfactants identified herein were added at concentrations both below and above the CMC of the respective surfactant.

TABLE 2

Aqueous Silica Nanofluid Compositions

| Nanofluid | Volume Fractions | Concentration (mg/mL) | Added SDS Surfactant Concentration (M) |
|---|---|---|---|
| Silica | 0.05, 0.1, 0.17 | 110, 220, 374 | 0.004, 0.02 |

Testing in Capillary Features

As shown in FIG. 1A to FIG. 1D, a radial disk geometry (shim panel 1), shown in a side view, was configured to provide the radial spread and measurement of the displacement or migration of chemical warfare agents (CWAs) in a pressed flat space. Capillaries were constructed from stainless steel disks (both bare and coated with polyurethane-based paint), referred to as shim disks 12 and 15. In the shim panel configuration 1, three disks are stacked such that bottom shim disk 15 (part no. 90313A105; McMaster-Carr; 0.219 in. i.d.; 1.250 in. o.d.; 0.043-0.057 in. thick) and top shim disk 12 (part no. 90313A400; McMaster-Carr; 0.203 in. i.d.; 0.750 in. o.d.; 0.033-0.047 in. thick) defined the capillary walls, while the middle shim disk 18 (part no. 98126A568 ring shim; McMaster-Carr; 0.02 in. thick [20 mil]; 0.25 in. i.d.) defines the capillary spacing 30 with its thickness. The assembly (shim panel 1) is compressed by a Phillips flat-head screw 4*a* (part no. 91099A355; McMaster-Carr; 82 deg countersink; 10-32 thread; ⅜ in. long; undercut) and nut assembly 4*b* tightened to a torque of 3 in.-lb. The assembly creates a feature depth 9 and shelf size 7 illustrated in the top-down view 5. The top-down view 5 illustrates the relative radii, i.e., $r_{top}$, $r_{shim}$, $r_{bottom}$, of the shim disks 12, 15, 18.

The general procedure for the shim panel 1 was to (1) deposit 1 μL of CWA simulant 20 that bridge disks 12 and 15; (2) wait 60 minutes; (3) apply the treatment (e.g., nanofluid); (4) wait up to 30 minutes; and (5) rinse three times with 20 μL aliquots of water to remove any accessible agent that was extracted during the treatment process.

Figure 2C:
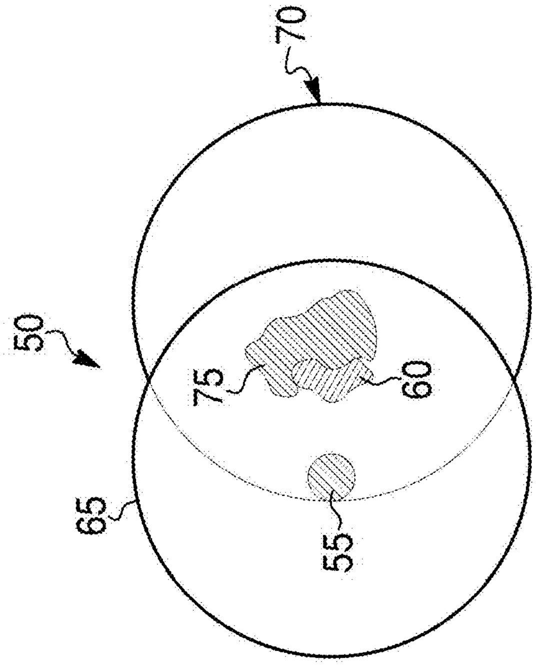
FIGS. 2A to 2C depict an alternative radial capillary geometry used in visualization experiments.
Figure 2A:
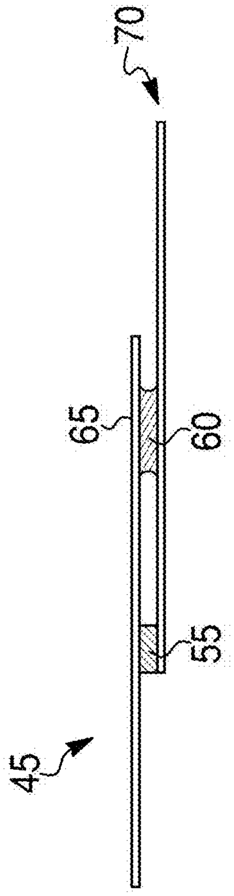
Figure 2B:
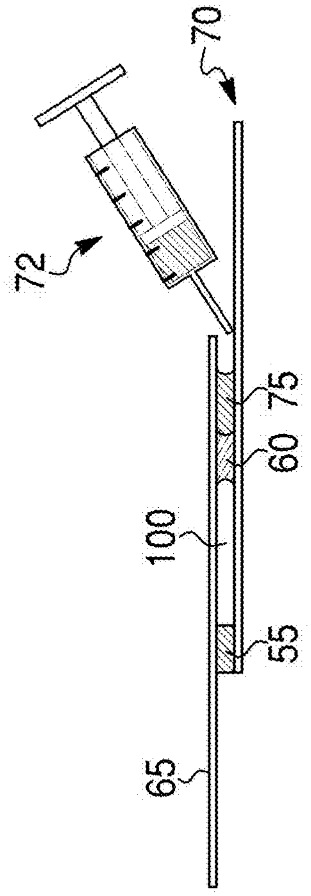

In an alternative radial capillary configuration as shown in FIGS. 2A to 2C, an off-centered shim panel 45 with similar dimensions as shim panel 1 from FIGS. 1A to 1D was produced. Shim panel 45 includes a glass top disk 65, a glass bottom disk 70, and a middle shim 55 having capillary space or feature 100 between the top disk 65 and bottom disk 75 such that a CWA simulant 1,8-dicholorooctane 60 was contained, and apparatus 72 was used to apply an aqueous nanofluid composition 75 into the capillary feature 100, wherein the CWA simulant 60 has no direct contact with any gas or compounds other than aqueous nanofluid composition 75. Construction of the capillary apparatus 45 from glass disks enables visualization of the dyed CWA simulant 60 during the nanofluid treatment process. Testing conditions used with the shim panel assembly from FIGS. 1A to 1D were applied to the configuration illustrated in FIGS. 2A to 2C. As shown in FIG. 2C, in a top-down view 50, the migration of CWA simulant 60 into the aqueous nanofluid composition 75 may be observed, and images were recorded in various time frames as illustrated in FIGS. 3A to 3C.

Figure 3A:
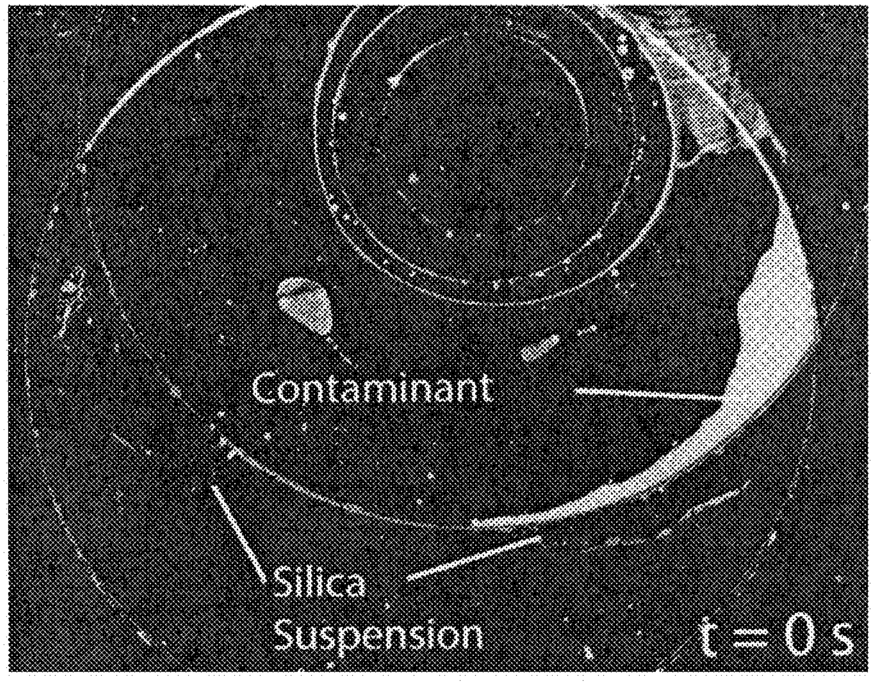
FIGS. 3A to 3C depict the result of a displacement of a chemical warfare agent from a radial capillary as shown in FIG. 2A to FIG. 2C using the inventive nanofluid composition, in various time frames.
Figure 3B:
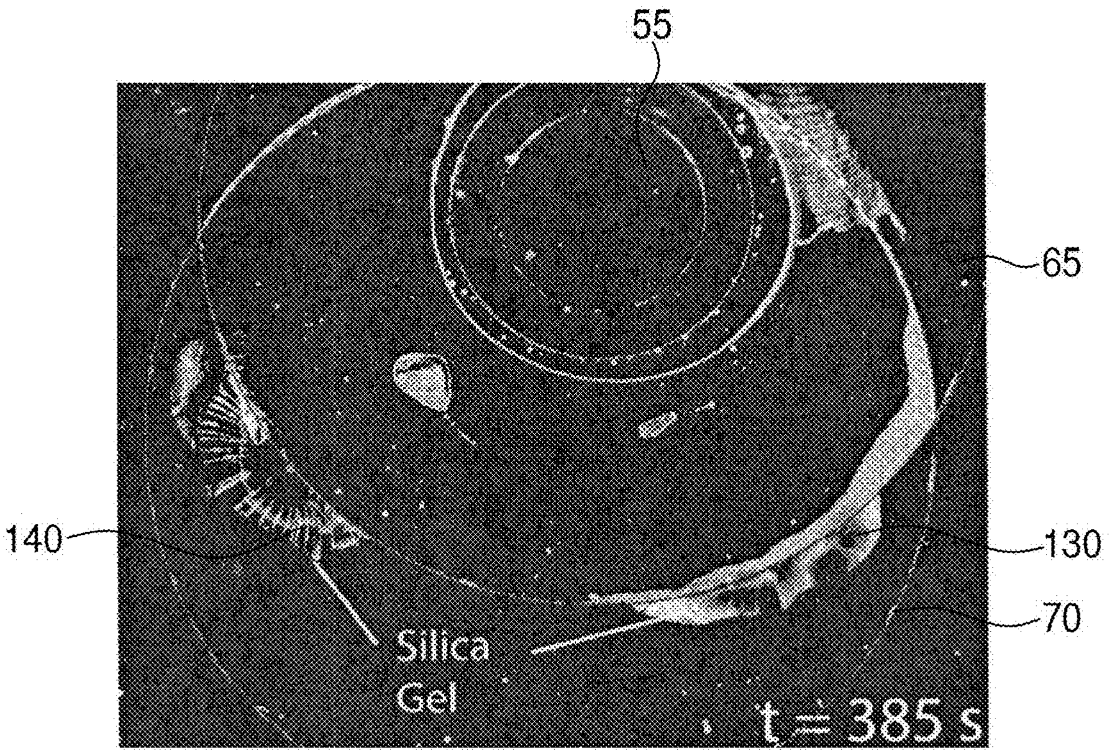
Figure 3C:
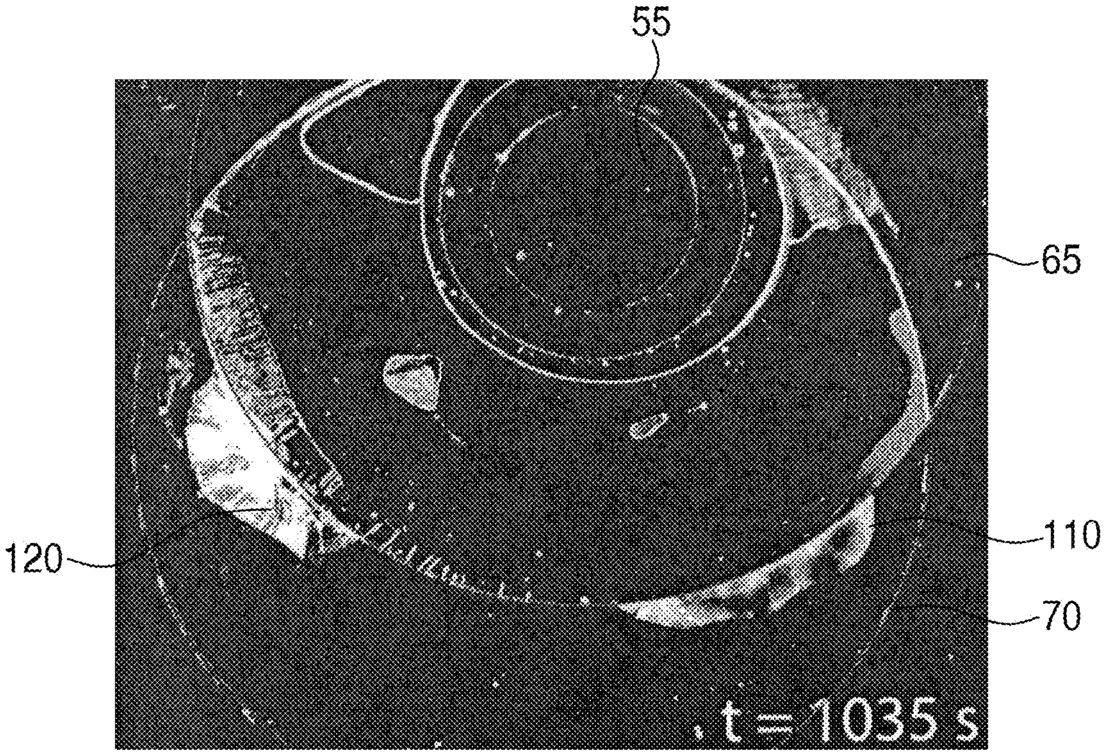

FIGS. 3A to 3C illustrate the treatment of 1,8-dichlorooctane as a CWA simulant 60 in a 50 μm radial capillary with a 17 vol % silica nanofluid, as illustrated in FIG. 2C, at various time frames. The applied aqueous nanofluid composition 75 fills the remaining volume of the radial capillary, and additional silica nanofluid 75 stayed at the capillary entrance, as shown in FIGS. 3A and 3B. Because the 1,8-dichlorooctane CWA simulant 60 partially wetted the surface of the silica nanoparticles and the capillary pressure is greater in the pore network of the nanofluid composition 75 than in the radial capillary of the shim panel 45, the 1,8-dichlorooctane in contact with the nanofluid composition, i.e., silica gel, was drawn into the pore network within 20-30 min. This is shown in FIG. 3B at 385 seconds and FIG. 3C at 1035 seconds, as depicted in the shaded areas 110, 120, 130 and 140 containing silica gel outside of disk 65.

Figure 4:
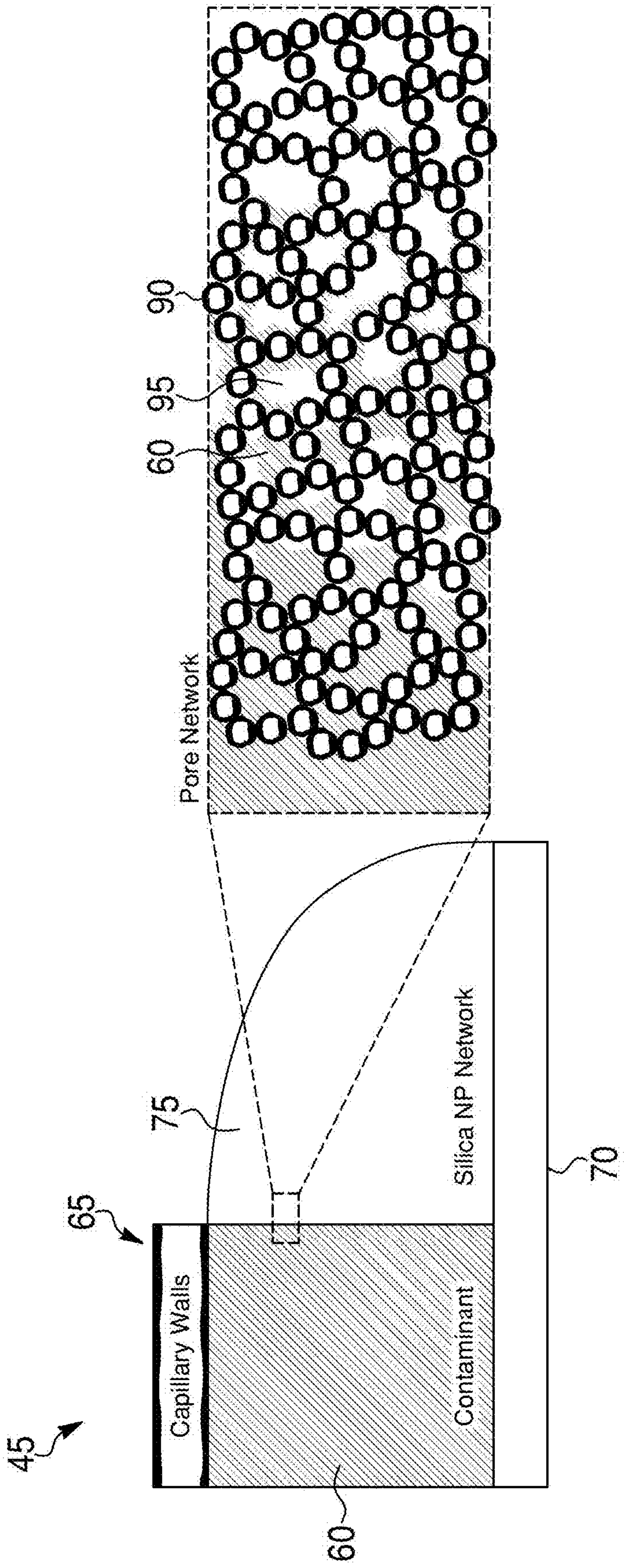
FIG. 4 depicts the migration of a chemical warfare agent from a capillary feature into the pore network formed by the aggregation of silica nanoparticles within the nanofluid composition.

A cross section view of FIG. 3C is illustrated by FIG. 4, which shows that as water 95 evaporates from the nanofluid 75, the silica nanoparticles 90 in the nanofluid 75 aggregate to form a gel with a pore network morphology, which leads to the removal of the CWA simulant 60 from the capillary feature into the pore network. This passive mechanism relies on a gradient of capillary pressure between the capillary feature and the pore network because of the small pore sizes (capillary pressure is inversely proportional to pore size).

The term "about" as used herein means greater or lesser than the value or range of values stated by 10 percent, but is not intended to designate any value or range of values to only this broader definition. Each value or range of values preceded by the term "about" is also intended to encompass the embodiment of the stated absolute value or range of values.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an," "said," and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Components and features described herein may be combined in any desired manner to achieve the desired performance goals.

The invention claimed is:

1. An aqueous nanofluid composition for displacing or removing at least one of chemical warfare agents (CWAs) from capillary features, comprising:

water;

colloidal silica, wherein said colloidal silica has a particle size of between 15 and 20 nm, wherein said colloidal silica has a volume fraction of 0.05 to 0.17, and wherein said colloidal silica has a concentration of 100 to 374 mg/ml; and at least one surfactant, wherein chemical warfare agents (CWAs) are selected from sulfur mustard and O-ethyl-S-(2-diisopropylaminoethyl) methyl phosphonothiolate and mixtures thereof, wherein said surfactant is selected from the group consisting of Alkyl (C8-18) sulfate and its ammonium, calcium, isopropylamine, magnesium, potassium, sodium, and/or zinc salts, and wherein said surfactant is present in the molar concentration (M) of 0.004 to 0.2.

* * * * *